Fig. I

INVENTORS
Knox B. Henderson
James O. Brown

ATTORNEYS

June 26, 1962 K. B. HENDERSON ETAL 3,040,572
METERING OIL AND GAS SEPARATORS
Filed Oct. 8, 1957 3 Sheets-Sheet 2
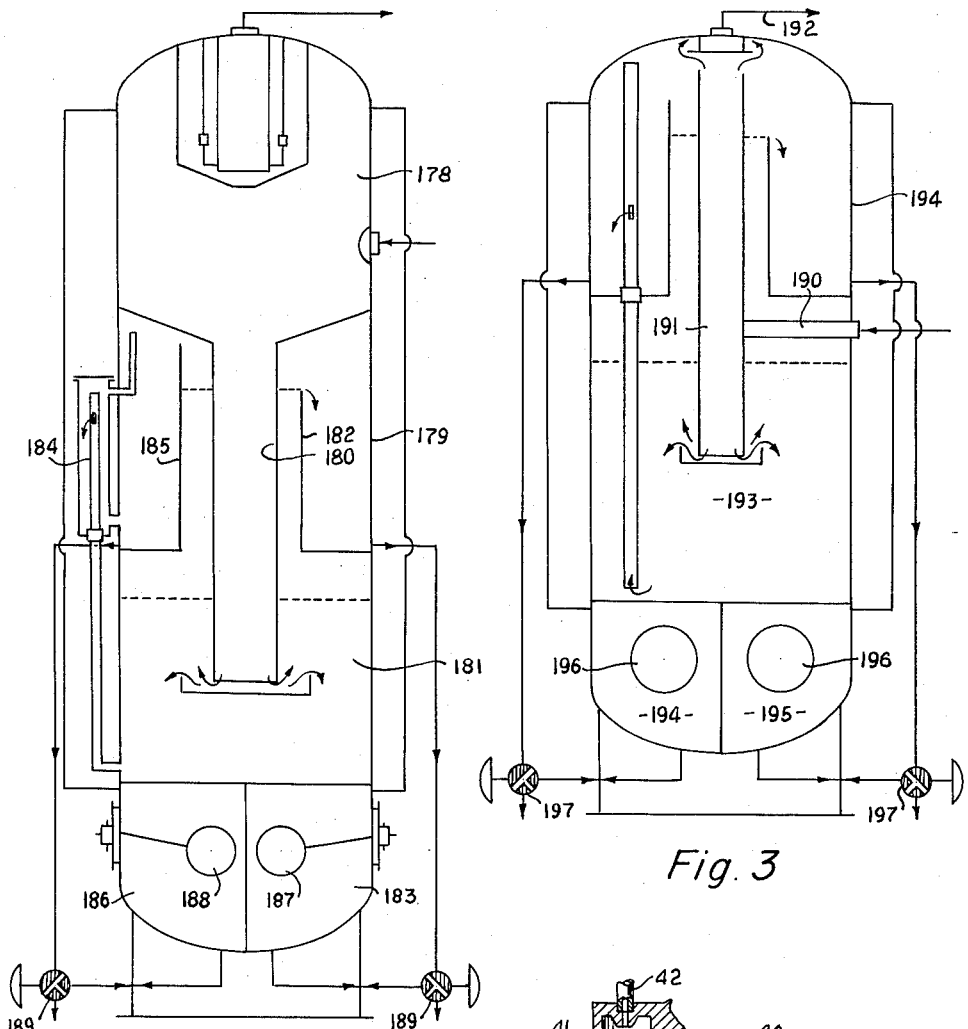
Fig. 2
Fig. 3
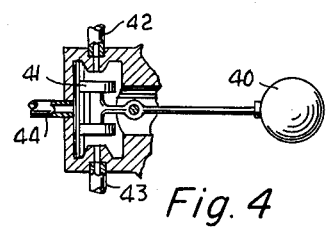
Fig. 4
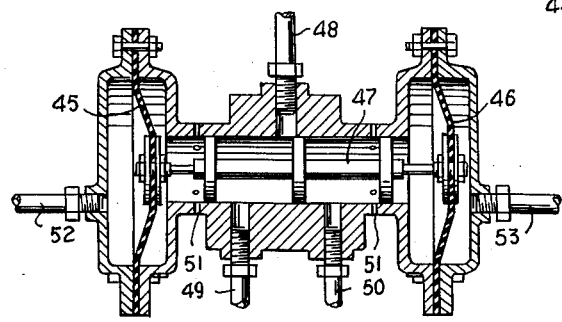
Fig. 5
INVENTORS
Knox B. Henderson
James O. Brown
BY
ATTORNEYS June 26, 1962  K. B. HENDERSON ETAL  3,040,572
METERING OIL AND GAS SEPARATORS
Filed Oct. 8, 1957  3 Sheets-Sheet 3

INVENTORS
Knox B. Henderson
James O. Brown

BY Ashley & Ashley

ATTORNEYS

United States Patent Office 3,040,572
Patented June 26, 1962

3,040,572
METERING OIL AND GAS SEPARATORS
Knox B. Henderson and James O. Brown, Tulsa, Okla., assignors to National Tank Company, Tulsa, Okla., a corporation of Nevada
Filed Oct. 8, 1957, Ser. No. 688,867
5 Claims. (Cl. 73—200)

This invention relates to new and useful improvements in metering oil and gas separators and methods employed therein.

The invention is particularly concerned with separators and separation of the type in which a petroleum well stream is separated into its oil, water and gas components, the volume of separated gas being metered as may be desired, and the separated oil and water components being automatically measured as to volume and discharged.

Petroleum well streams vary considerably insofar as the pressure under which they are produced, the relative volumes of water and oil which may be present, and particularly in the gas/oil ratio of the stream, or the volume of gas per unit volume of the oil. Further, it is sometimes desirable to separate such streams under relatively constant pressure, or under variable pressure, to measure the separated oil under pressure or under substantially atmospheric conditions, and to provide for the necessary static heads or pressure conditions to insure prompt and adequate flow of liquids within and between the various compartments of the separating vessel as well as the discharge of such liquids to storage tanks, disposal, or other point of flow.

It is, therefore, one object of this invention to provide improved metering oil and gas separators, of simple and compact construction, providing for high metering or measuring accuracy of both separated water and separated oil, and having provision therein for efficient and effective oil and gas separation as well as the stratification of water from the oil, and provision, when required or desirable for creating pressural conditions conducive to the rapid flow of fluids within or from the vessel, for retarding flow into the vessel when abnormal operating conditions occur, and for carrying out the metering operations under such pressural conditions as may be desired.

A particular object of the invention is to provide improved methods of carrying out the foregoing operations.

Other and more particular objects will be obvious from a reading of the following description and specification and reference is made thereto.

Constructions designed to carry out the invention will be hereinafter described, together with other features of the invention.

The invention will be more readily understood from a reading of the following specification and by reference to the accompanying drawings wherein examples of the invention are shown, and wherein:

FIGS. 2 and 3 are vertical schematic views of modifications of the invention,

FIG. 4 is a transverse sectional view of one of the float-controlled pilot valves, FIG. 5 is a transverse sectional view of one of the relay valves.

Figure 1:
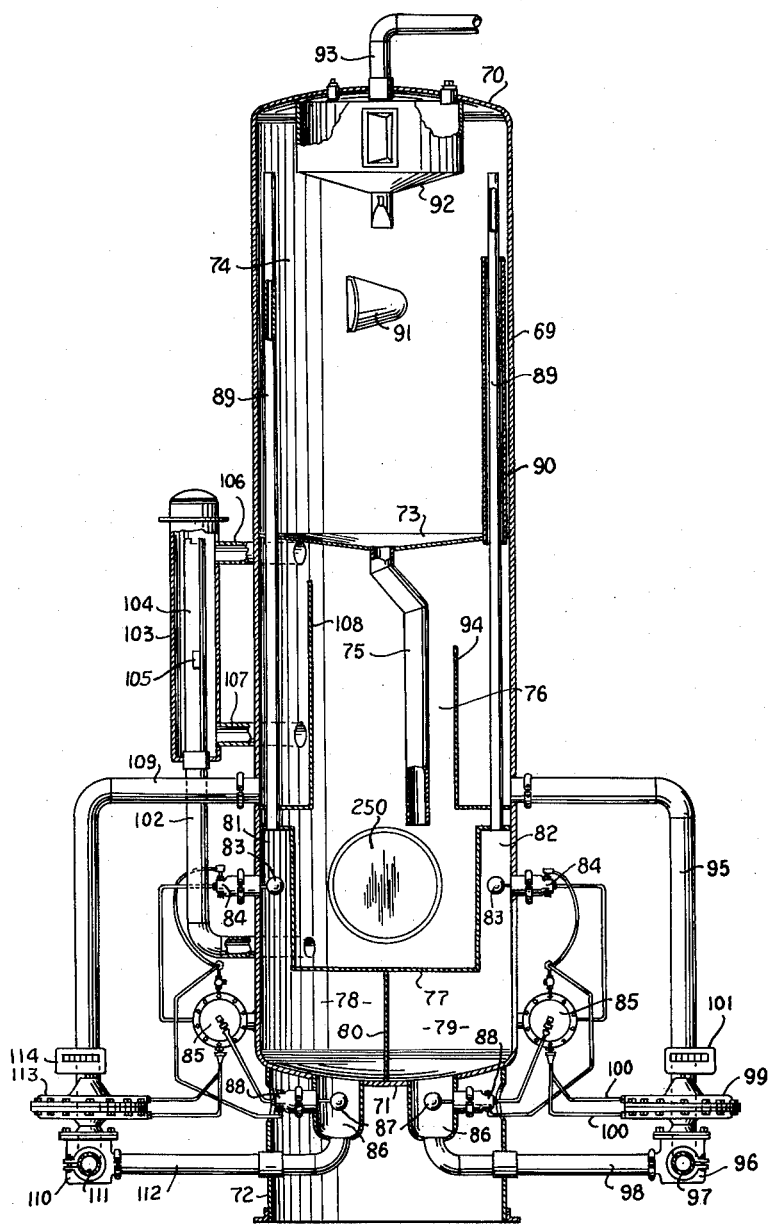
FIG. 1 is a vertical sectional view, partially broken away, illustrating a metering oil and gas separator constructed in accordance with this invention and adapted to carry out the methods thereof.

This application is directed to subject-matter related to the subject-matter disclosed in the copending application of Clarence O. Glasgow and Knox B. Henderson, Serial No. 688,571, filed October 7, 1957, now Patent No. 2,971,376, and the copending application of Jay P. Walker and Clarence O. Glasgow, Serial No. 716,968, filed February 24, 1958, and reference is made thereto.

There are many types of float-operated pilot valves, a typical structure thereof being shown somewhat schematically in FIG. 4 of the drawings. In this structure, the float ball 40 is pivotally mounted and carries upon the opposite end of its lever arm a double-faced valve element 41 adapted to open or close upper and lower conductors 42 and 43 in accordance with downward and upward movement of the float. There is a third conductor 44 constantly in communication with the interior of the valve structure, and thus, in accordance with the movements of the float, either the conductor 42 or the conductor 43 is placed in communication with the conductor 44. In most instances, the conductor 44 will be connected to the diaphragm housing of the diaphragm-operated valve, one of the conductors 42 and 43 being connected to a source of pilot gas under pressure, and the other of said conductors 42 and 43 constituting a vent for releasing gas pressure from the diaphragm housing. The clearances of the valve structure have been somewhat exaggerated and the structure greatly simplified for purposes of illustration, such structures normally having a very small length of travel, and often being of the snap-acting variety so that there is virtually no lapse of time between the placing of the conductor 44 in communication with either the conductor 42 or the conductor 43.

There are also numerous varieties of relay valves, a typical and highly simplified structure being shown on FIG. 5 of the drawings. These are four-way valve structures in which a pair of opposed diaphragms 45 and 46 are connected to a single valve shaft 47 selectively controlling flow from a gas inlet conductor 48 to either of a pair of gas outlet conductors 49 and 50. When one of the conductors 49 and 50 is in communication with the conductor 48, the other of said conductors is vented to the atmosphere through suitable ports 51. The structure is springless, and hence, once the valve shaft 47 has been moved into a particular position by one of the diaphragms, the valve will remain in that position whether pressure continues to be applied or not. As will be seen more fully hereinafter, the pilot valves are employed to apply pressure selectively to one of the diaphragms 45 or 46 through the inlet conductors 52 and 53, the conductors 49 and 50 being connected to opposite sides of the diaphragm of a diaphragm valve for selectively applying pressure thereto from the conductor 48 for holding the valve in an open or a closed position. This structure is quite conventional in the art, and no further description or explanation thereof is thought necessary.

Figures 6, 7:
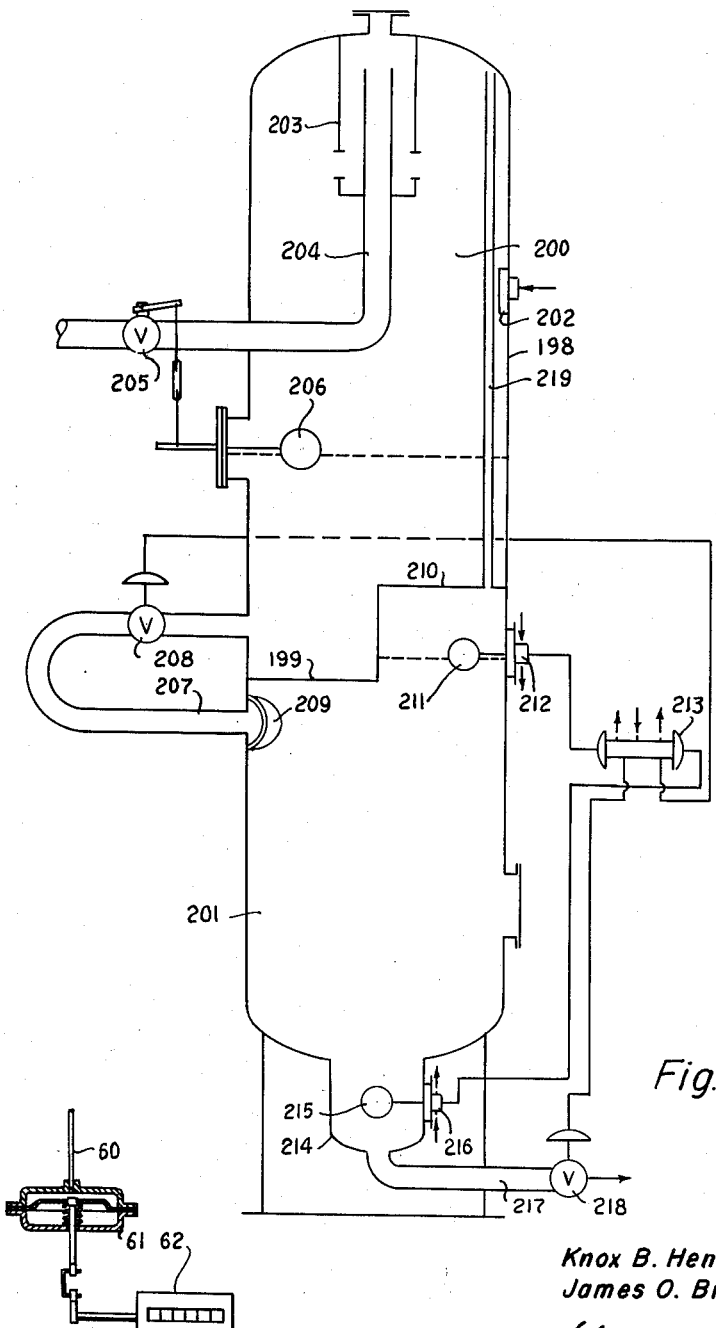
FIG. 6 is a vertical schematic view of an additional modification of the invention.
FIG. 7 is a transverse view, partly in section, illustrating the cycle counting mechanism.

The counter structure is also well known in this art and may be of any suitable or desirable type, the counter being directly connected to the valve stem of the valve with which it is associated for mechanical operation, or in the alternative, being pneumatically actuated in the manner illustrated in FIG. 7. In the latter structure, a gas supply conductor 60 may be connected into a diaphragm housing 61 for actuation of a mechanical counter 62, the pipe 60 being connected into any suitable pipe so as to record each metering cycle. Obviously, various other and suitable types of counting mechanisms may be employed.

The form of the invention shown in FIG. 1 is adapted to handle well streams having large gas/oil ratios, but is further adapted for the measuring of both the separated oil and the separated water. The form of the invention includes an upright cylindrical vessel 69 having a closed top 70 and bottom 71, and being carried upon a suitable support 72. An intermediate dished partition 73 within the vessel defines the bottom or lower wall of a gas separation compartment 74 in the upper portion of the vessel, and a drain conductor 75 leads downwardly from the partition 73 into a separation and stratification chamber 76. A second partition 77 in the lower portion of the vessel 69 forms the bottom of the chamber 76 and the upper wall of a pair of metering chambers 78 and 79 divided by a vertical partition 80 extending from the bottom 71 of the vessel 69 to the medial portion of the partition 77.

Elogate float boxes 81 and 82 extend upwardly from the chambers 78 and 79 respectively, the float boxes being of relatively small cross-sectional area and being adapted to receive level-responsive means, such as the floats 83, for operating pilot valves 84 and relay valves 85 in the manner described in conjunction with FIGS. 4 and 5. Further, sumps 86 of reduced cross-section depend from the bottoms of the chambers 78 and 79 and receive floats 87 for operating pilot valves 88 and the relay valves 85. Gas venting and equalizing risers 89 extend upwardly from the float boxes 81 and 82 into the upper portion of the separation chamber 74, the riser from the box 82 extending upwardly through an additional gas vent conductor 90 extending from the upper portion of the chamber 76 into the upper portion of the chamber 74. Thus, all of the chambers are maintained in pressural communication for equalization of the gas pressures within the several chambers and for flow of gas between the chambers as may be required.

The well stream is introduced into the separation chamber 74 through a diverter box inlet 91 provided in the side wall of the chamber, the well stream being directed circumferentially and tangentially of the walls of the chamber 74 for scrubbing of gas therefrom and the spreading of the well stream into a thin layer or film from which gas is readily evolved. The separated liquids pass downwardly through the conductor 75 into the chamber 76 wherein the liquids separate and stratify into water and oil layers, the remaining gas present in the liquids evolving therefrom during this quieting and stratifying step to pass upwardly through the conductor or vent 90 into the chamber 74. The separated gasses are removed through a mist extractor 92 and gas outlet pipe 93 which may contain suitable conventional means for metering the volume of the gas, as may be required or found desirable.

The separated liquids continue to accumulate within the chamber 76 until the uppermost layer of hydrocarbons reach the upper edge of a relatively deep weir box 94 of appreciable cross-section and having therefore a quite sizable internal volume. A petroleum discharge conductor 95 leads from the bottom of the weir box 94 through a diaphragm operated or suitable motor valve 96 having an outlet conductor 97 and a flow conductor 98 leading to the bottom of the sump 86 in communication with the oil metering chamber 79. While any suitable type of valve or valves may be employed for controlling the flow of separated oil to and from the compartment 79, the three-way diaphragm operated valve 96 has been found suitable and convenient, the upper and lower sides of the diaphragm case 99 being suitably connected through conductors 100 with the relay valve 85 for automatic switching of the valve, as previously described, between positions in which separated oil flows through the conductor 95 into the compartment 79 or is discharged from the chamber 79 through the oil outlet conductor 97. A counter 101 connected to the operating mechanism of the valve 96, records the opening and closing or switching cycles of the valve, the upper and lower floats 83 and 87 within the chamber 79 operating through the pilot valves 84 and 88 to actuate the relay valve 85 and switch the valve 96 in accordance with the filling and emptying of the chamber 89 as sensed by the aforesaid floats. Thus, the calibrated chamber 79 is automatically filled and emptied and a record of the number of emptyings or fillings maintained so that the volume of separated and discharged oil is accurately measured and recorded.

For removing separated water from the chamber 76 in accordance with its rate of accumulation therein, a relatively conventional water leg structure is provided and includes an overflow conductor 102 extending from the lower portion of the chamber 76 upwardly into an overflow chamber 103 through an adjustable standpipe 104 having therein an overflow opening 105, the elevation of which within the chamber 103 may be varied by screwing the standpipe upwardly and downwardly within the chamber. For gas equalization, a conductor 106 extends from the upper portion of the chamber 103 into the upper portion of the chamber 76, and a water discharge pipe 107 extends between the lower portion of the chamber 103 and a water accumulation box 108, similar to the weir box 94 and positioned within the chamber 76. The box 108 is of considerable internal volume and is provided with an outlet conductor 109 extending downwardly to a motor-actuated three-way valve 110 having a water outlet branch 111 and a second branch conductor 112 leading to the bottom of the sump 86 located in the lower portion of the chamber 78. The valve 110 is provided with an actuating diaphragm housing 113 and counting mechanism 114 and is operated by the second relay valve 85 in the same manner as described in conjunction with the valve 96, the chamber 78 being alternately filled and emptied with measured quantities of water and a permanent record of the number of fillings or emptyings being kept by the counter 114.

It is to be noted that the weir box 94 and the accumulation box 108 are of relatively large internal volume, the internal volume of the box 108 being supplemented by the internal volume of the chamber 103, and hence, fillings and emptyings of the metering chambers 78 and 79 have little or no effect upon the volumes of oil and water present within the chamber 76. Accordingly, the elevation of the interface between the layers of oil and water accumulated within the chamber 76 remains relatively constant. It is important to the proper functioning of the stratification chamber 76 that the interface level be disturbed as little as possible, and the provision of the relatively large volume accumulation spaces for separated oil and water from which the metering chambers 78 and 79 are filled, results in the attaining of the desirable objective and reduces or eliminates any fluctuation or variation of the interface level.

A somewhat similar form of the invention is shown in FIG. 2, in which the separation chamber 178 occupies the entire upper portion of the modified separator unit 179 and is provided with a relatively large central flume 180 extending downwardly into the stratification chamber 181. The other details of structure are substantially the same, the separated oil overflowing into the weir box 182 and flowing therefrom into the oil metering chamber 183, while the water is withdrawn through a water leg structure 184 into an accumulation box 185 from whence the separated water flows into the water-metering chamber 186. Single floats 187 and 188 are utilized in the metering chambers 183 and 186 and control three-way valves 189 for the filling and emptying of the metering chambers for the oil and water. A similar structure is shown in FIG. 3 in which the well stream is admitted through an inlet conductor 190 into a central vertical flume 191 wherein such small quantities of gas as may be present flow directly upwardly to the gas outlet 192, the separated liquids flowing downwardly by gravity into the quite large separation and stratification chamber 193 which occupies substantially the entire interior of the separator vessel 194. In other respects, this modification is quite similar to that of FIG. 2, there being provided a water metering chamber 194 and an oil metering chamber 195 having therein single floats 196 for controlling the operation of the three-way filling and discharge valve 197. Both the modifications of FIG. 2 and FIG. 3 are again adapted to the handling of well streams having relatively low gas contents, both of these modifications providing quite large stratification chambers and large discharge spaces for the separated oil and water whereby the interface level within the stratification chamber is held in a stable position, and very effective removal and separation of water from the well stream is obtained.

A somewhat different form of the invention is illustrated in FIG. 6 in which provision is made for two oil and gas separation steps with control of the back pressure on the two steps to insure the rapid and adequate flow of separated liquids from the first step to the second as well as the discharge of liquids from the second or metering chamber. The separator vessel 198 is provided with an intermediate partition 199 dividing the interior of the vessel into an upper separating chamber 200 and a lower separating and metering chamber 201. The well stream is admitted into the upper chamber 200 through a diverter 202 which spreads the well stream in a thin film on the inner wall of the separating chamber for the effective and rapid evolution of gas therefrom, the gas being withdrawn through the mist extractor 203 and gas outlet conductor 204 having therein a gas outlet control valve 205 mechanically connected, or otherwise suitably operated by a float 206 positioned within the chamber 200. A drain conductor 207 leads through a motor-operated valve 208 from the lower portion of the chamber 200 into the upper portion of the chamber 201, opening into the latter through a diverter box 209 whereby the separated liquids are again spread in a thin layer and passed tangentially and circumferentially of the wall of the chamber 201 for further and final gas removal. The partition 199 is provided with an upstanding float box 210 of restricted cross-sectional area and containing an upper float 211 operating a suitable pilot valve 212 connected to a relay valve 213. Further, a sump 214 in the bottom of the chamber 201 contains a float 215 operating a relay valve 216 which also is connected to the relay valve 213. A separate oil discharge conductor 217 leads from the sump 214 through a motor operated valve 218, the valves 208 and 218 being two-way valves and functioning together in the same manner as the three-way valves previously described.

As stated above, the well stream is admitted tangentially and circumferentially into the upper separating chamber 200 and therein thoroughly scrubbed on the walls of the separating chamber for effective removal of gas therefrom. The liquids from which the major portion of gas has been removed are discharged into the lower chamber 201 wherein the liquids are again scrubbed upon the chamber walls and substantially complete gas separation effected. The chamber 201 also functions as a measuring or metering chamber, the upper and lower floats 211 and 215 functioning as hereinbefore described to control the filling and emptying of the chamber, the positioning of the floats within zones of restricted cross-section affording greater accuracy of measurement due to the more rapid movement or change in elevation of the liquid levels in accordance with volume flow into and out of the metering chamber. During the time the metering chamber is filling, it may happen that liquids will tend to accumulate within the chamber 200, and in such event, the float 206 will be raised to close or partially close the gas control valve 205, thus increasing the pressure within the chamber 200 and increasing the rate of flow of liquids therefrom into the chamber 201. Likewise, when the chamber 201 is emptying and the valve 208 is closed, separated liquids will accumulate within the chamber 200, assuming the well flow to be of sufficient volume at this time, and again the valve 205 will be closed or partially closed to place pressure upon the chamber 200 and resist the flow thereinto of further quantities of liquid, while at the same time this increased pressure will be applied to the chamber 201 through the gas equalizer pipe 219 extending from the upper portion of the box 210 to the upper portion of the chamber 200, and accordingly, the application of increased gas pressures to the chamber 201 will facilitate and render more rapid the flow of liquids from the chamber 201 through the outlet conductor 217. Of course, a suitable counting mechanism, such as that shown in FIG. 7, may be connected at any point into the pilot gas supply system so as to respond to actuations of the relay valve 213 and record the number of times the chamber 201 is filled and emptied, as described hereinbefore.

As shown by the numeral 250 in FIG. 1, suitable heating means of any type, such as fire-tube, steam coils, or other heating elements is adapted to be positioned in any of the chambers of the various modifications illustrated, in order to supply desired degrees of heating to the well fluids to prevent congealing of oil or freezing of water under adverse weather conditions, or for such other purposes under such other conditions as may render heating desirable or necessary.

The optional heating of the liquid contents of the separator by means of a fire tube or other heating means will function to maintain a constant temperature in the metering chambers for greater accuracy of measurement as well as keeping the measured liquids in a thoroughly fluid state which becomes important under cold weather operating conditions, or when an oil having a high pour point is being handled. The higher temperatures in the metering chamber will also reduce the viscosity of the oil to minimize drainage time of the measured liquids from the walls of the metering chamber or chambers as well as preventing the deposition of paraffin in the oil metering chamber. In addition the increased temperatures will tend to liberate gas from the liquids for more effective oil and gas separation and greater metering accuracy and otherwise enhance both the effectiveness of the separation and the exactness of the metering operation.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A metering liquid and gas separator structure for well streams including, a liquid and gas separator enclosure having a well stream inlet, a gas outlet from the separator enclosure, water and oil outlets from the separator enclosure, a water metering enclosure, an oil metering enclosure, a common wall separating the separator enclosure from the water metering enclosure and the oil metering enclosure, both the water and oil outlets having conductors leading to the water and oil metering enclosures respectively, valve means for controlling the flow of liquids from the separator enclosure to the metering enclosures and the discharge of liquids therefrom, liquid outlets from the metering enclosures, and liquid level means responsive to the liquid levels in the metering enclosures for closing the valve means, and heating means in the separator enclosure positioned closely adjacent said common wall.

2. The method of separating a well stream into its liquid and gas components and metering the separated liquid including, directing the well stream into a liquid and gas separator enclosure wherein the well stream separates into water, oil and gas layers, withdrawing separated gas from the enclosure, flowing separated oil from the separator enclosure to an oil metering enclosure, flowing separated water from the separator enclosure to a water metering enclosure, heating the water, oil and gas in the separator enclosure and in the metering enclosures to aid the separation of gas from the liquids and to prevent accumulation of paraffin in the separator enclosure and metering enclosures and to maintain the oil in a fluid state, alternately filling and emptying the metering enclosures, recording the number of fillings and emptyings of the enclosures separately, and discharging the liquid emptied from the metering enclosures.

3. The method of separating a well stream into its liquid and gas components and metering the separated liquid including, directing the well stream into a liquid and gas separator enclosure wherein the well stream separates into liquid and gas layers, withdrawing separated gas from the enclosure, flowing separated liquid from the separator enclosure into a liquid metering enclosure, heating the liquid layer in the separator enclosure and the separated liquid in the liquid metering enclosure to aid the separation of gas from the liquids and to prevent accumulation of paraffin in the separator enclosure and the liquid metering enclosure and to maintain the separated liquid in a fluid state, alternately filling and emptying the metering enclosures, recording the number of fillings and emptyings of the enclosure, and discharging the liquid from the metering enclosure.

4. A metering liquid and gas separator structure for well streams including, a liquid and gas separator enclosure having a well stream inlet, a gas outlet from the separator enclosure, a liquid outlet from the separator enclosure, a liquid metering enclosure, a common wall separating said enclosures, a conductor leading from the metering enclosure to the liquid outlet of the separator enclosure, valve means for controlling the flow of liquid from the separator enclosure to the metering enclosure and the discharge of liquid therefrom, a liquid outlet from the metering enclosure, liquid level means responsive to the liquid level in the metering enclosure for controlling the valve means, and heating means in the separator enclosure positioned closely adjacent said common wall.

5. A metering liquid and gas separator structure for well streams including, a liquid and gas separator enclosure having a well stream inlet, a gas outlet from the separator enclosure, water and oil outlets from the separator enclosure, a water metering enclosure, an oil metering enclosure, the water metering enclosure having a heat exchange wall in heat exchange relationship with the separator enclosure, the oil metering enclosure having a heat exchange wall in heat exchange relationship with the separator enclosure, both the water and oil outlets having conductors leading to the water and oil metering enclosures respectively, valve means for controlling the flow of liquids from the separator enclosure to the metering enclosures and the discharge of liquids therefrom, liquid outlets from the metering enclosures, liquid level means responsive to the liquid levels in the metering enclosures for controlling the valve means, and heating means in the separator enclosure positioned closely adjacent said heat exchange walls of the water metering enclosure and the oil metering enclosure.

References Cited in the file of this patent

UNITED STATES PATENTS

| | | |
|---|---|---|
| 2,158,381 | Raymond | May 16, 1939 |
| 2,211,282 | McKeever | Aug. 13, 1940 |
| 2,225,949 | Bennett | Dec. 24, 1940 |
| 2,226,097 | Happel et al. | Dec. 24, 1940 |
| 2,306,606 | Hirsch | Dec. 29, 1942 |
| 2,615,528 | Williams | Oct. 28, 1952 |
| 2,701,620 | Crawford | Feb. 8, 1955 |
| 2,773,556 | Meyers et al. | Dec. 11, 1956 |
| 2,831,350 | Banks et al. | Apr. 23, 1958 |

OTHER REFERENCES

Composite Catalogue of Oil Field and Pipeline Equipment, 19th 1952–53 edition, volume 2, J to Z, published by World Oil, The Gulf Publishing Co., Houston, Tex., page 4493 pertinent. (Copy in Scientific Library.)